Dec. 28, 1954         J. R. MILLS ET AL         2,698,344
PROCESS FOR THE PRODUCTION OF GUANIDINE SULFAMATE
Filed Oct. 4, 1950
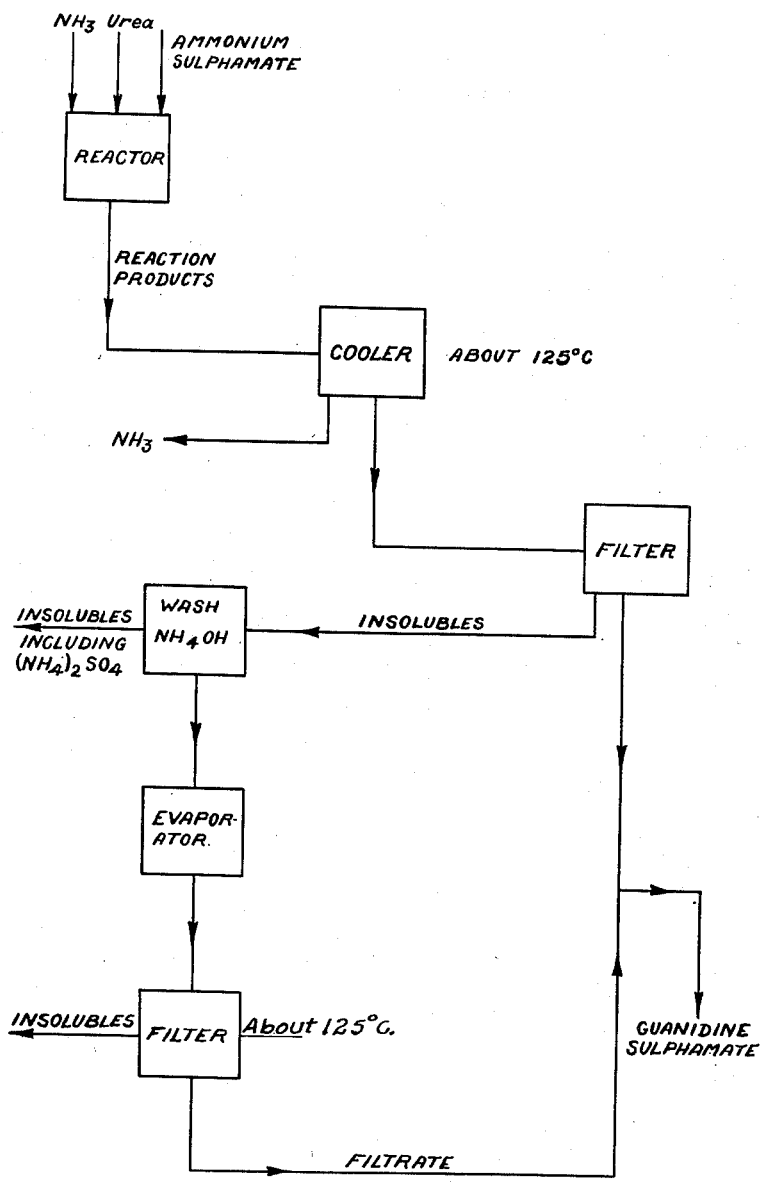
INVENTORS
J. R. MILLS
J. N. ROBINSON
F. J. L. MILLER
PER
ATTORNEY.

United States Patent Office 2,698,344
Patented Dec. 28, 1954

2,698,344

PROCESS FOR THE PRODUCTION OF GUANIDINE SULFAMATE

James Roland Mills, Joseph Newton Robinson, and Frederick John Leslie Miller, Trail, British Columbia, Canada, assignors to The Consolidated Mining and Smelting Company of Canada, Limited, Montreal, Quebec, Canada, a corporation of Canada Application October 4, 1950, Serial No. 188,474

3 Claims. (Cl. 260—564)

This invention relates to a process for the production of guanidine sulphamate from urea and related compounds.

An important object of this invention is to provide a novel process for the production of guanidine sulphamate, in high yield substantially free from other reaction products, from at least one member of the group consisting of aquo-ammono carbonic acids, such as urea, and the ammonium salts of aquo-ammono carbonic acids.

A further important object of the invention is to provide a process for producing guanidine sulphamate, which may be operated inexpensively within relatively wide temperature and pressure ranges.

In general, the process of the present invention involves the steps of reacting at least one of the compounds selected from the group consisting of the aquo-ammono carbonic acids and the ammonium salts of the aquo-ammono carbonic acids, preferably urea, with at least one of the compounds selected from the group consisting of the aquo-ammono sulphuric acids and the ammonium salts of the aquo-ammono sulphuric acids, preferably ammonium sulphamate, in the ratio equivalent to at least about 2 mols ammonium sulphamate to 1 mol urea and in the presence of ammonia, at a temperature above 200° C. and under at least the autogenously generated superatmospheric pressure, for a time interval sufficient to convert the major portion of the reacting compounds to guanidine sulphamate, but insufficient to form appreciable amounts of heterocyclic compounds, and subsequently separating the guanidine sulphamate from the reaction mixture.

In the following description of the invention, there can be substituted for all or part of the urea one or more other members of the group consisting of the aquo-ammono carbonic acids and the ammonium salts of the aquo-ammono carbonic acids to react with ammonium sulphamate in the presence of ammonia to form guanidine sulphamate. This group includes, for example, urea, ammonium carbamate, biuret, ammonium cyanate, guanyl-urea, ammelidie, ammeline and cyanuric acid.

Also, a member or members of the group consisting of the aquo-ammono sulphuric acids and the ammonium salts of the aquo-ammono sulphuric acids, can be substituted for all or part of the ammonium sulphamate for the purpose of this invention. Certain members of this group are formed by reacting ammonia with sulphur trioxide in various proportions for example, about two mols ammonia per mol sulphur trioxide. The members of this group include, for example, diammonium imido disulphonate, sulphamide, and sulphamic acid.

We have found that the factors temperature, time, pressure of ammonia and the mol ratio of the reactants have an important effect on the yield of guanidine sulphamate obtainable in the employment of the present process. For example, if the reaction is conducted at a temperature of about 260° C., a high yield of guanidine sulphamate is obtained in a short period of time and the guanidine sulphamate does not readily form heterocyclic compounds at this temperature, whereas, if a temperature of about 330° C. is employed, then the reaction time is reduced about 75%, or to less than one quarter of the time required for the production of a similar yield at 260° C., but the yield of guanidine sulphamate gradually diminishes on prolonged heating at this higher temperature.

We have found, also, that in the production of guanidine sulphamate in high yield from urea and ammonium sulphamate in the presence of ammonia under superatmospheric pressure it is necessary to employ a concentration of ammonium sulphamate equal to or greater than a ratio of about 2 mols ammonium sulphamate per mol urea in order to obtain the maximum yield. When a mol ratio appreciably less than 2 mols ammonium sulphamate per mol urea is employed, smaller yields of guanidine sulphamate are obtained and there is a tendency to form cyclic compounds, such as melamine, ammeline, and similar heterocyclic compounds.

While the invention is independent of hypothetical considerations, it appears that the reaction may follow, as one of several possible courses, the sequence indicated by the equations set out below:

1. $CO(NH_2)_2 + NH_3 = NHC(NH_2)_2 + H_2O$
2. $H_2O + NH_4OSO_2NH_2 = (NH_4)_2SO_4$
3. $NHC(NH_2)_2 + NH_4OSO_2NH_2 = NHC(NH_2)_2 \cdot HOSO_2NH_2 + NH_3$ The net result may be represented by the equation:

4. $CO(NH_2)_2 + 2NH_4OSO_2NH_2 = NHC(NH_2)_2 \cdot HOSO_2NH_2 + (NH_4)_2SO_4$

According to the above reactions, for each mol of urea, one mol ammonium sulphamate is required as a dehydrating agent and one additional mol of ammonium sulphamate is required to form a stable compound of guanidine. If insufficient ammonium sulphamate is added to stabilize the guanidine, the guanidine tends to form heterocyclic compounds which detract from the yield of guanidine sulphamate.

The process can be operated with somewhat less than 2 mols ammonium sulphamate per mol urea but it is found that lower yields of guanidine sulphamate are obtained. Also, higher ratios than 2 mols ammonium sulphamate per mol urea can be employed, but such higher ratios do not produce appreciably higher yields of guanidine sulphamate and have the disadvantage of increasing the amount of unreacted ammonium sulphamate. Thus, while it is preferred to employ a mol ratio of about 2 mols ammonium sulphamate per mol urea in the conduct of the process, it can be conducted when employing a lower or higher mol ratio than 2:1 but with a lowered yield of guanidine sulphamate or with an increase in the amount of unreacted ammonium sulphamate present in the reaction mixture respectively.

In instances in which all or part of the urea is replaced by compounds related to urea as defined hereinbefore, the proportion of ammonium sulphamate required per mol of such substitute compound, corresponding to the ratio of about 2 mols ammonium sulphamate per mol urea, can be determined readily, as illustrated by example hereinafter.

The effect of variations in the mol ratio of ammonium sulphamate to urea is illustrated in the following examples in which urea, ammonium sulphamate and liquid ammonia were charged into a pressure vessel provided with a suitable glass lining and having an internal available volume of about 450 cc. The pressure vessel was heated to about 260° C. in one hour and this temperature was maintained for one hour under the autogenous pressure developed. The vessel was then cooled in one hour to room temperature and the contents removed and analysed. In each example, except No. 6, 15 g. urea were used with the required weight of ammonium sulphamate to produce the desired mol ratio of ammonium sulphamate to urea. In Example No. 6, a smaller pressure vessel was employed.

Table I

| | Mol Ratio: Ammonium Sulphamate to Urea | Time, min. | Temp., °C. | Pressure of Ammonia, p. s. i. | Percent Yield (Based on Urea) |
|---|---|---|---|---|---|
| 1 | 0:1 | 60 | 260 | 2,800 | 4 |
| 2 | 0.5:1 | 60 | 260 | 2,900 | 42 |
| 3 | 1:1 | 60 | 260 | 1,670 | 70 |
| 4 | 2.1:1 | 60 | 260 | 2,750 | 90 |
| 5 | 3.15:1 | 60 | 260 | 500 | 90 |
| 6 | 5:1 | 60 | 260 | 500 | 75 |

In analysing the contents of the pressure vessels after the experiments, the cooled reaction products were heated gently to evaporate all the free ammonia and the residue was ground finely and analysed for guanidine. The presence of the guanidine sulphamate and of ammonium sulphate was confirmed by examination of the X-ray diffraction patterns obtained from the reaction products.

In calculating the yields of guanidine sulphamate obtained in these and in the other examples, the yields are expressed as a percentage by weight of the maximum yield theoretically obtainable from the urea charged into the reaction vessel according to Equation 4 above.

For example, if 60 g. urea (1 mol) were used, the maximum yield obtainable if the reaction were to go to completion, would be 156 g. guanidine sulphamate (1 mol); from 100 g. urea, 260 g. guanidine sulphamate would be obtainable theoretically.

The following examples illustrated by Table II hereafter illustrate the effect of conducting the urea-ammonium sulphamate reaction in the presence of ammonia. Ammonium sulphamate and urea were reacted in the mol ratio of 2:1 in a pressure vessel under a nitrogen atmosphere at high pressure. A much lower yield of guanidine sulphamate resulted than in the case where ammonia at that pressure was employed.

We have found that the presence of ammonia, under pressure in excess of that due to any ammonia produced by thermal decomposition of urea and ammonium sulphamate, is necessary if high yields of guanidine sulphamate are to be obtained in carrying out the process of this invention. When urea and ammonium sulphamate are heated, some ammonia is released, but it is preferred, to ensure the maintenance of ammonia at the prevailing pressure during the course of the reaction, to add ammonia, in the form of liquid ammonia, with the reactants introduced into the pressure vessel.

The reaction proceeds efficiently in the presence of ammonia added in sufficient amount to produce relatively low pressures, for example, of the order of about 200 p. s. i. Satisfactory results are also obtained at pressures up to 4000 p. s. i. and higher. These high pressures may be generated at these temperatures by addition of sufficient ammonia, but under these conditions the operation of the process tends to become uneconomic due to the difficulties inherent in the use of high pressures.

It is found that the most satisfactory results as regards yield of guanidine sulphamate, time of retention, cost of operation and simplicity are obtained when there is sufficient free ammonia present in the system to generate a pressure of at least about 500 p. s. i. and preferably within the range from about 500 to about 1000 p. s. i.

Further examples are illustrated by Table II in which each charge to the pressure vessel described above consisted of 15 g. urea with 60 g. ammonium sulphamate, but different quantities of liquid ammonia were added.

*Table II*

| Mol Ratio: Ammonium Sulphamate to Urea | Time, hr. | Temp., °C. | Pressure, p. s. i. | Percent Yield (Based on Urea) |
| --- | --- | --- | --- | --- |
| 2.1:1 | 1 | 250 | $N_2$ at 1,200 | 63 |
| 2.1:1 | 1 | 250 | $NH_3$ at 1,200 | 92 |
| 2.1:1 | 1 | 260 | no added $NH_3$ | 75 |
| 2.1:1 | 1 | 260 | $NH_3$ at 200 | 88 |
| 2.1:1 | 1 | 260 | $NH_3$ at 1,000 | 95 |
| 2.1:1 | 1 | 260 | $NH_3$ at 2,700 | 90 |

We have found further that the reaction proceeds at 200° C. very slowly and gives a low yield of guanidine sulphamate within a reasonable period, whereas at 220° C. the reaction proceeds slowly, but gives a substantially higher yield in a similar period. The reaction proceeds faster as the temperature is increased and gives a high yield within the range of from about 250° C. to about 300° C. While the reaction proceeds more rapidly as the temperature is increased, the yield becomes diminished due to the formation of heterocyclic compounds if the time of retention is prolonged at the higher temperatures.

For example, we have found that high yields of guanidine sulphamate can be obtained from the prescribed concentrations of urea and ammonium sulphamate in the presence of ammonia by maintaining the reaction mixture for a period of at least ten minutes at a temperature of about 260° C. or higher, and that at temperatures close to 260° C. there is little diminution in the yield of the guanidine sulphamate product when heated for one hour. At higher temperatures, such as at 300° C., high yields are obtained in about ten minutes, but on prolonged heating there is a tendency to form heterocyclic compounds at the expense of guanidine sulphamate, for instance if the product is heated for more than 60 minutes at these high temperatures.

The relationship between the reaction temperature and the time of retention and the yield of guanidine sulphamate was investigated carefully in a series of experiments conducted in small glass-lined pressure vessels with an internal volume of about 15 cc. A charge consisting of the desired weights of urea (0.285 g.), ammonium sulphamate and liquid ammonia was placed in each pressure vessel and sealed at room temperature. The pressure vessels were heated to a temperature of about 200° C. in an electric furnace and were then transferred to a salt bath maintained at the desired reaction temperature for a predetermined time, after which the pressure vessels were cooled quickly to below 200° C. and then more slowly to room temperature for analysis of their contents. Certain of these experiments (Nos. 15, 16 and 17) to show the effect of temperature upon yield, were carried out in the autoclave described hereinabove. The results are set out in Table III.

*Table III*

| Run | Mol Ratio: Ammonium Sulphamate to Urea | Time | Temp., °C. | Pressure, p. s. i. | Percent Yield (Based on Urea) |
| --- | --- | --- | --- | --- | --- |
| 1 | 2.1:1 | 15.6 hr | 200 | 400 | 28.6 |
| 2 | 2.1:1 | 90 min | 220 | 400 | 78 |
| 3 | 2.1:1 | 44 hrs | 220 | 400 | 90 |
| 4 | 3.2:1 | 150 min | 250 | 500 | 88 |
| 5 | 3.2:1 | 5 min | 260 | 500 | 30 |
| 6 | 3.2:1 | 10 min | 260 | 500 | 89 |
| 7 | 3.2:1 | 120 min | 260 | 500 | 90 |
| 8 | 3.2:1 | 5 min | 270 | 500 | 26 |
| 9 | 3.2:1 | 20 min | 270 | 500 | 89 |
| 10 | 3.2:1 | 40 min | 270 | 500 | 89 |
| 11 | 3.2:1 | 110 min | 270 | 500 | 83 |
| 12 | 3.2:1 | 236 min | 270 | 500 | 43 |
| 13 | 3.2:1 | 10 min | 300 | 200 | 87 |
| 14 | 3.2:1 | 40 min | 300 | 200 | 81 |
| 15 | 2.1:1 | 60 min | 260 | 1,000 | 94 |
| 16 | 2.1:1 | 60 min | 315 | 1,400 | 60 |
| 17 | 2.1:1 | 60 min | 365 | 1,500 | 29 |
| 18 | 3.2:1 | 2 min | 330 | 500 | 87.8 |
| 19 | 3.2:1 | 5 min | 330 | 500 | 91.5 |
| 20 | 3.2:1 | 10 min | 330 | 500 | 88.0 |
| 21 | 3.2:1 | 15 min | 330 | 500 | 77.0 |

The process was also conducted by substituting for urea certain other members of the group consisting of the aquo-ammono carbonic acids and ammonium salts of aquo-ammono carbonic acids, such as cyanuric acid and biuret. These were reacted with ammonium sulphamate in the presence of ammonia in the manner described above. In these examples, ammonium sulphamate was employed in the mol ratio with respect to the particular compound as would correspond to the ratio of 2 mols ammonium sulphamate per mol urea, and high yields of guanidine sulphamate were obtained, as illustrated by Table IV.

Table IV

| Cyanuric Acid, g. | Ammonium Sulphamate, g. | Time, min. | Temp., °C. | Pressure, p. s. i. | GS, g. | Yield based on Carbon of Cyanuric Acid, percent |
|---|---|---|---|---|---|---|
| 15 | 80 | 60 | 260 | 550 | 47.7 | 87.6 |

Mol Ratio Ammonium Sulphamate:Cyanuric Acid=6:1.
Equivalent mol ratio of Ammonium Sulphamate:Urea=2:1.

| Biuret, g. | Ammonium Sulphamate, g. | Time, min. | Temp., °C. | Pressure, p. s. i. | GS, g. | Yield based on Carbon of Biuret, percent |
|---|---|---|---|---|---|---|
| 4.29 | 20 | 60 | 255 | 550 | 11.4 | 89.5 |

Mol Ratio Ammonium Sulphamate:Biuret=4.2:1.
Equivalent mol ratio of Ammonium Sulphamate:Urea=2.1:1.

It has been found further that all or part of the ammonium sulphamate content of the starting compounds can be replaced by one or more other members of the group consisting of the aquo-ammono sulphuric acids and the ammonium salts of the aquo-ammono sulphuric acids to react with the urea or substitute compound to form guanidine sulphamate. Certain members of this group are formed by reacting ammonia with sulphur trioxide. This modification is exemplified in the experiment in which urea, sulphamic acid and ammonia were charged into the autoclave described above and allowed to react at 260° C. under a pressure of ammonia above about 200 pounds per square inch. A yield of guanidine sulphamate amounting to 85% of the theoretical yield was obtained.

In another example, ammonia and sulphur trioxide were reacted in the proportion of at least 2 mols ammonia to 1 mol sulphur trioxide, at slightly above room temperature and at atmospheric pressure. The resultant product (45 g.) was reacted with urea (7.5 g.), these quantities corresponding to the proportion of approximately 2 mols ammonium sulphamate to 1 mol urea, and in the presence of ammonia at 500 p. s. i. for 45 minutes and at a temperature of 300° C. A yield of guanidine sulphamate amounting to 66% of the theoretical, was obtained.

In a further example, diammonium imido disulphonate (80 g.) was reacted with urea (15 g.), these quantities corresponding to the proportion of approximately 2 mols ammonium sulphamate to 1 mol urea, in the presence of ammonia at 430 p. s. i. for 60 minutes and at a temperature of 300° C. A yield of guanidine sulphamate, amounting to 70% of the theoretical, was obtained.

We have found also in the operation of the process that the reactants should be substantially free from moisture.

In order to separate the guanidine sulphamate from the other reaction products when operating the process of this invention, as illustrated in the accompanying flow sheet drawing, it is preferred to remove the reaction mixture from the reaction zone to a region maintained at a lower temperature and preferably just above 125° C. wherein the free ammonia is removed by evaporation under the reduced pressure. The mixture is then filtered at a temperature above the melting point of guanidine sulphamate, which is about 125° C. In this manner, the major part of the ammonium sulphate and melamine and related heterocyclic compounds are separated from the primary filtrate containing the guanidine sulphamate and any unreacted urea and ammonium sulphamate.

While about 75% of the guanidine sulphamate and unreacted urea and ammonium sulphamate can be recovered in the molten filtrate in this manner, the remainder, adhering to the filter cake of ammonium sulphate and other insoluble particles, can be recovered by extraction with strong aqua-ammonia in which the guanidine sulphamate and unreacted urea and ammonium sulphamate are very soluble, but in which the ammonium sulphate is only slightly soluble. The extract is evaporated until the water and ammonia have been completely removed, a temperature above 125° C. being maintained towards the end of the evaporation. The molten extract in which the minor amount of ammonium sulphate, extracted by the aqua-ammonia, is found suspended as a solid, is filtered to remove the ammonium sulphate. The molten guanidine sulphamate and unreacted materials are then added to the primary filtrate and subjected to such further processing as may be desired. The high yield of guanidine sulphamate produced by this process can be separated from unreacted materials and recovered in substantially pure form by, for example, crystallization, or can be converted to other compounds of guanidine by conventional methods.

We have found, in the operation of the process described above, that the reaction mixtures are extremely corrosive. Thus, the pressure vessels and other apparatus employed in the process should be protected by corrosion resistant linings. Tantalum and certain glasses and enamels are satisfactory for this purpose.

We have found that a number of important advantages are derived from the operation of the present invention. The process can be operated easily and inexpensively as a batch process or as a continuous process to produce a high yield of guanidine sulphamate heretofore considered impossible to realize. Also, the guanidine sulphamate produced by the synthesis has a low melting temperature and forms a fluid melt which is easily and inexpensively separated from the reaction mixture.

It will be understood, of course, that modifications may be made in the preferred embodiments of the process described above without departing from the scope of the invention defined by the appended claims.

What we claim as new and desire to protect by Letters Patent of the United States is:

1. The method of producing guanidine sulphamate which comprises reacting urea and ammonium sulphamate in the presence of added ammonia at a temperature within the range of from about 200° C. to about 330° C. and under a pressure of ammonia of at least 200 pounds per square inch, the reactants being present in the mol ratio of at least about 2 mols ammonium sulphamate per mol urea.

2. The method of producing guanidine sulphamate which comprises the step of reacting at a temperature within the range of from about 200° C. to about 330° C. at least one compound selected from the group consisting of urea, biuret and cyanuric acid with ammonium sulphamate in the presence of added ammonia and under a pressure of ammonia above about 200 pounds per square inch, the ammonium sulphamate being present in the mol ratio equivalent to at least about 2 mols ammonium sulphamate per mol urea, and recovering guanidine sulphamate from the reaction mixture.

3. The method of producing guanidine sulphamate which comprises the steps of reacting urea and ammonium sulphamate in the ratio of at least about 2 mols ammonium sulphamate per mol urea at a temperature within the range of from about 260° C. to about 330° C. in the presence of added ammonia and under a pressure of ammonia of from about 200 to about 1000 pounds per square inch for a time period within the range of from 2 to 15 minutes at the higher temperature limit to from 10 to 120 minutes at the lower temperature limit, cooling the reaction mixture, and separating guanidine sulphamate therefrom.

(References on following page)

References Cited in the file of this patent

UNITED STATES PATENTS

| Number | Name | Date |
|---|---|---|
| 2,221,478 | Hill et al. | Nov. 12, 1940 |
| 2,417,440 | Paden et al. | Mar. 18, 1947 |
| 2,464,247 | Mackay | Mar. 15, 1949 |
| 2,515,244 | Mackay | July 18, 1950 |
| 2,550,659 | Vingee | Apr. 24, 1951 |
| 2,566,228 | Mackay | Aug. 28, 1951 |
| 2,567,676 | Marsh | Sept. 11, 1951 |
| 2,567,677 | Marsh | Sept. 11, 1951 |
| 2,590,257 | Mackay | Mar. 25, 1952 |